United States Patent
McConville

[15] 3,662,466
[45] May 16, 1972

[54] DENTAL DAM

[72] Inventor: Richard S. McConville, 2525 Bailey Avenue, San Jose, Calif. 95128

[22] Filed: Apr. 5, 1971

[21] Appl. No.: 131,251

[52] U.S. Cl. ..................................................32/34
[51] Int. Cl. ..................................................A61c 5/12
[58] Field of Search............................................32/34; 33/1

[56] References Cited

UNITED STATES PATENTS

| 278,091 | 5/1883 | Burk | 32/34 |
| 1,579,608 | 4/1926 | Haudenshield | 32/34 |

*Primary Examiner*—Robert Peshock
*Attorney*—Jack M. Wiseman

[57] ABSTRACT

Premarked dental dams and devices for marking dental dams, are mechanisms that are employed for locating holes to be selectively pierced by the dentist in the dental dam through which teeth protrude. The markings follow the average alignment of teeth as they appear in the dental arch. The patterns of the markings of the teeth of the lower arch are located on the dental dam with respect to the superior edge of the dental dam. One group of patterns represents the primary, mixed and permanent dentition for a 5-inch × 5-inch dental dam. Another group of patterns represents the primary, mixed and permanent dentition for a 6-inch × 6-inch dental dam. The pattern of the group selected for a particular arch is dependent on the tooth of that particular arch to be clamped.

18 Claims, 5 Drawing Figures

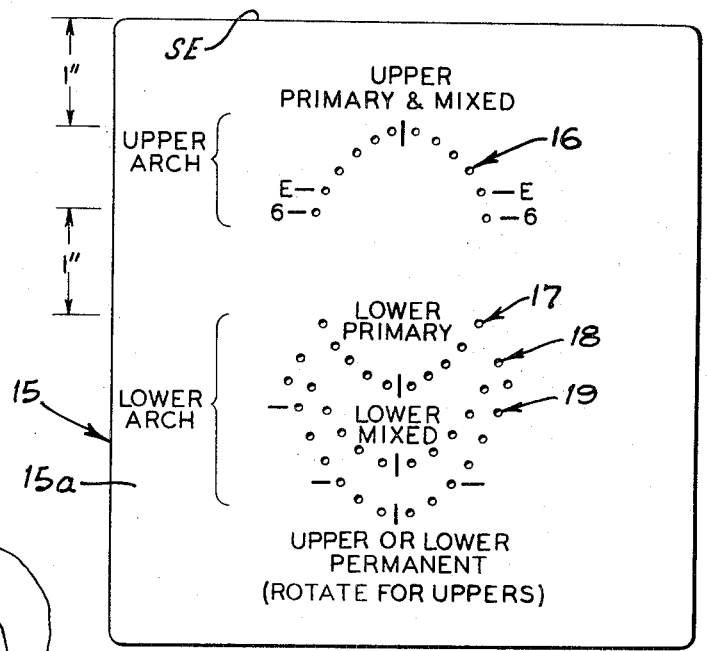
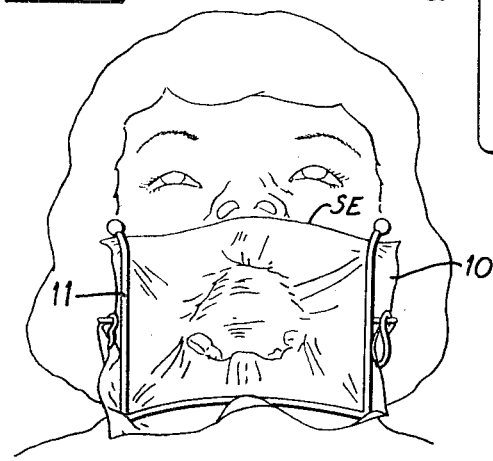

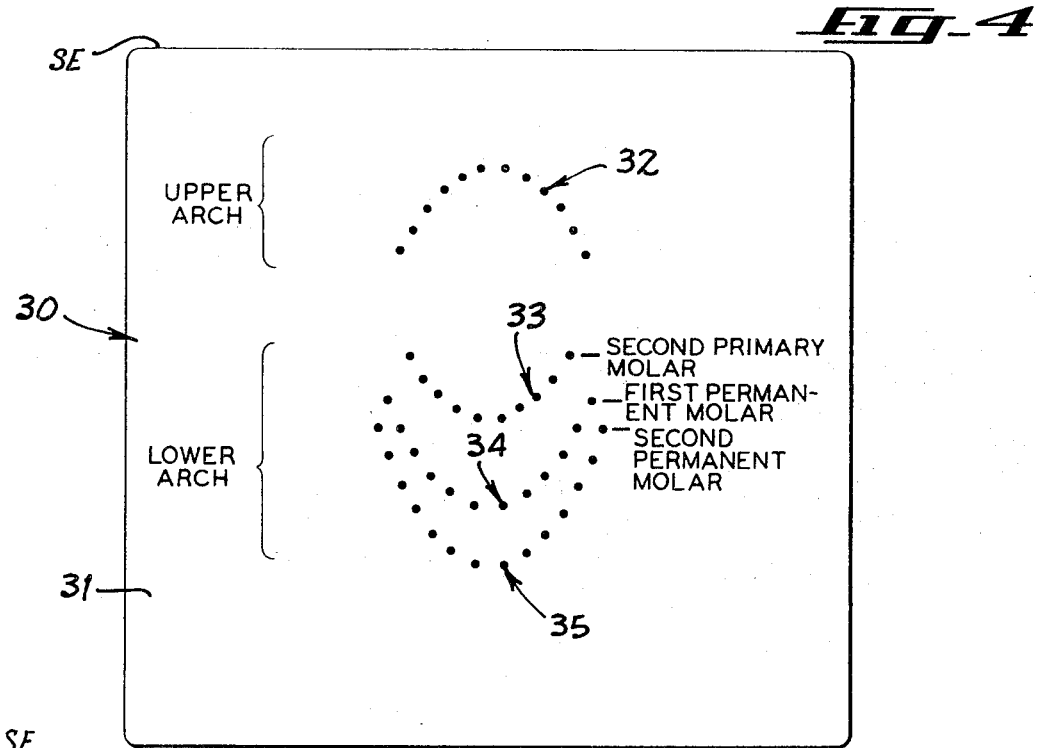
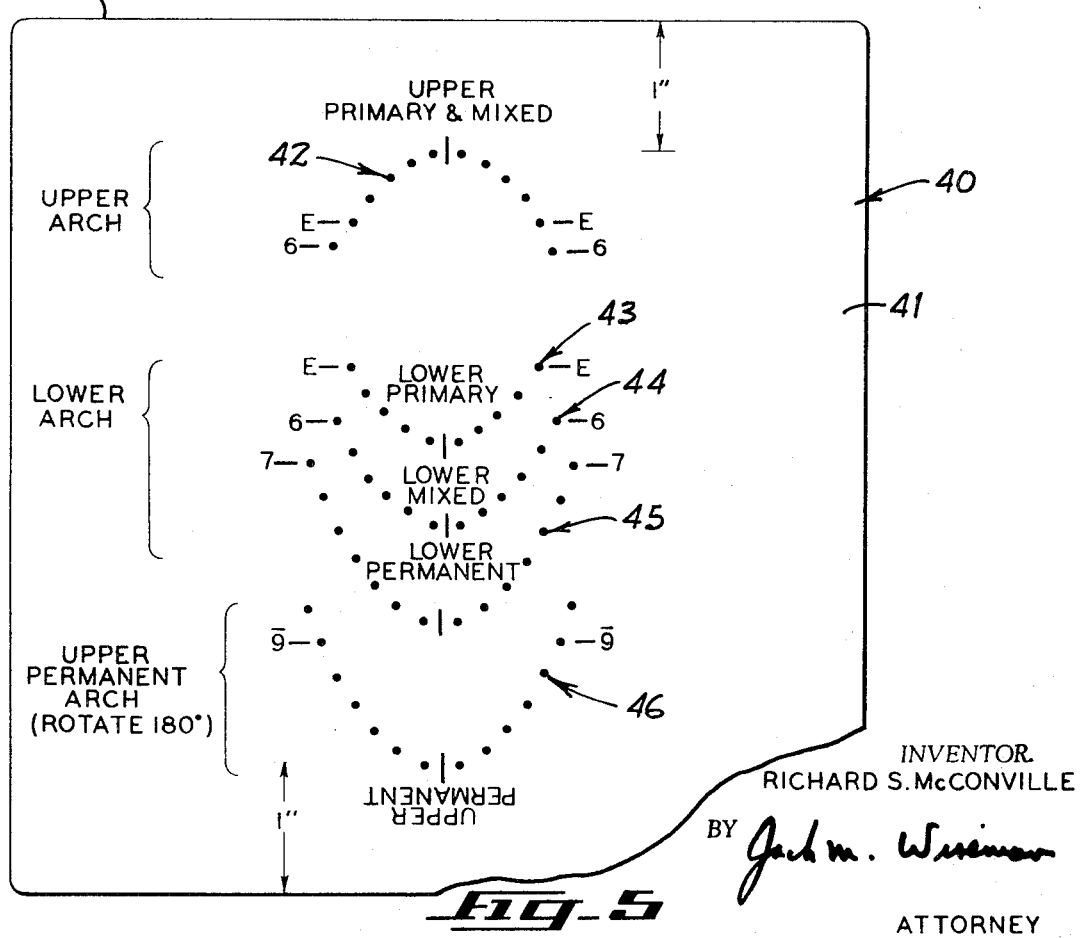

3,662,466

DENTAL DAM

BACKGROUND OF THE INVENTION

The present invention relates in general to dental devices, and more particularly to a dental dam.

Heretofore, dentists have employed rubber dams to isolate teeth to be restored. Small holes are punched into the apron of the rubber dam through which teeth protrude. The dam is held securely in the patient's mouth by clamping selected teeth of the dental arch. In using the rubber dam, the teeth isolated by the rubber dam are free from the flow of saliva, which would contaminate the restoring material and also which would obstruct the view of the dentist.

In order for the rubber dam to function properly, and to fit the patient's face comfortably, the small holes in the rubber dam must be located so as to follow the alignment of the teeth as they appear in the dental arch. Also, the superior edge of the rubber dam should be positioned below the nose and the superior portion of the rubber dam should cover the upper lip. The inferior portion of the rubber dam should be positioned so as to cover all or part of the patient's chin.

Heretofore, dentists located various landmarks to serve as guides and marked the rubber dam through the location of the landmarks. The markings were rough estimates for locating holes. Accuracy and consistency were lacking. Prior efforts to employ templates, guides and rubber stamps in marking or locating markings on rubber dams through which a dentist pierced holes in the dental dam failed to consider the relationship of the superior edge of the rubber dam with respect to the patterns of the lower dental arch.

Previously existing techniques for locating the holes in the rubber dam through which teeth protrude were inaccurate and inconsistent, since estimating and guess-work were employed. Such techniques were also time consuming and did not lend themselves to delegation of duties to assistants and aids by virtue of the complexity thereof.

SUMMARY OF THE INVENTION

A device for marking a dental dam which takes into consideration the relationship of the dental arch to the superior edge of the dental dam.

The premarking of a dental dam which takes into consideration the relationship of the dental arch to the superior edge of the dental dam.

A device for marking a dental dam having a group of patterns for the dental arches taking into consideration different patterns for the lower dental arch for the primary and mixed dentition, and/or the permanent dentition.

The premarking of a dental dam having a group of patterns for the dental arches taking into consideration different patterns for the lower dental arch for the primary and mixed dentition, and/or the permanent dentition.

A device for marking a dental dam having a group of patterns for the dental arches taking into consideration different patterns for the lower dental arch for the primary and mixed dentition and/or the permanent dentition, which pattern for the dental arch is selected by the tooth to be clamped.

The premarking of a dental dam having a group of patterns for the dental arch taking into consideration different patterns for the dental arch for the primary and mixed dentition and/or the permanent dentition, which pattern for the dental arch is selected by the tooth to be clamped.

A dental dam formed with openings to receive teeth, which openings take into consideration the relationship of the dental arch to the superior edge of the dental dam.

A dental dam formed with openings to receive teeth, which openings form a group of patterns for the dental arches taking into consideration different patterns for the lower dental arch for the primary and mixed dentition, and/or permanent dentition.

By virtue of the present invention, holes through which teeth are to protrude in rubber dams can be formed by the producer of the rubber dam or by the dentist with greater facility, more accuracy, and in less time. Less guess-work and greater consistency are also achieved.

DESCRIPTION OF THE DRAWINGS

FIG. 1 is a diagrammatic illustration of a conventional dental dam shown attached to a patient's face.

FIG. 2 is a top view of a device embodying the present invention for use in the primary, mixed and permanent dentition for a 5-inch × 5-inch dental dam.

FIG. 3 is a top view of a device embodying the present invention for use in the primary, mixed and permanent dentition for a 6-inch × 6-inch dental dam.

FIG. 4 is a top view of a premarked 5-inch × 5-inch dental dam embodying the present invention for use in the primary, mixed and permanent dentition.

FIG. 5 is a top view of a premarked 6-inch × 6-inch dental dam embodying the present invention for use in the primary, mixed and permanent dentition.

DESCRIPTION OF THE PREFERRED EMBODIMENTS

Illustrated in FIG. 1 is a thin sheet of flexible elastic material 10, such as sheet rubber, which is placed over the oral cavity of a patient. Thereupon, a U-shaped frame 11 is positioned over the dental dam 10. Patents of general interest in this regard are the patent to Young, U.S. Pat. No. 682,308, and the patent to McConville, U.S. Pat. No. 3,406,452.

The dental dam 10 is secured to the frame 11 by turning edges of the dental dam 10, extending outside of the frame 11, over and pressing it against the tines of the frame 11. After placing the dental dam 10 on the frame 11, the frame 11 is strapped to the patient's head. Clamps, not shown, position a portion of the dental dam 10 within the oral cavity so that the dental dam 10 covers a plurality of teeth and adjacent gum area. One or more holes or openings are provided in the dental dam 10 through which teeth protrude to provide access to the desired working area that it is to be isolated from oral fluids and other areas to insure cleanliness of the working area, reduction of contamination of restorative material, and reduction of obstruction by fluids to a dentist in viewing the working area.

Illustrated in FIG. 2 is a rigid device 15 for a 5-inch× 5-inch dental dam embodying the present invention for use in connection with a primary, mixed and permanent dentition. The device 15 comprises a rigid body 15a. At the upper portion of the body 15a is a pattern 16 of holes which follow the alignment of teeth as they appear in the average upper dental arch for the primary and mixed dentition. At the lower portion of the body 15a are three spaced patterns 17-19 of holes which follow the alignment of teeth as they appear in the average lower dental arch representing the primary, mixed and permanent dentition, respectively. In lieu of holes, the device 15 may be formed with patterns of projections to produce imprints.

Most frequently, the second primary molar, the first permanent molar and the second permanent molar are clamped in the primary, mixed and permanent dentition of the lower arch. When the second primary molar of the lower arch is to be clamped, the pattern 17 is used. When the first permanent molar of the lower arch is to be clamped, the pattern 18 is employed and when the second permanent molar of the lower arch is to be clamped, the pattern 19 is used.

The pattern 19 for the clamping of the lower second permanent molar when the device 15 is rotated 180° becomes the pattern of the upper arch for the permanent dentition.

In FIG. 3 is illustrated a rigid device 20 for a 6-inch × 6-inch dental dam embodying the present invention for use in connection with a primary, mixed and permanent dentition. The device 20 comprises a rigid body 21. At the upper portion of the body 21 is a pattern 22 of holes which follow the alignment of teeth as they appear in the average upper dental arch for the primary and mixed dentition. At the lower portion of the body 15 are four spaced patterns 24-27. The first three patterns 24-26 follow the alignment of teeth as they appear in the average lower primary, mixed and permanent dental arch, respectively. The fourth pattern 27 represents the alignment of the average upper dental arch for the permanent dentition. The device must be rotated 180° to utilize this pattern. Most frequently, the second primary molar, the first permanent molar and the second permanent molar are clamped in the primary, mixed and permanent dentition of the lower arch. When the second primary molar of the lower arch is to be clamped, the pattern 17 is used. When the first permanent molar of the lower arch is to be clamped, the pattern 18 is employed and when the second permanent molar of the lower arch is to be clamped, the pattern 19 is used. In lieu of patterns of holes, the device 20 may be formed with patterns of projections to produce imprints.

The devices 15 and 20 are used by the dentist to mark the dental dam so that the dentist can pierce the appropriate markings on the dental dam to form holes in the dental dam through which teeth protrude. To do so, a dentist merely places either the device 15 or the device 20, whichever is appropriate, above a dental dam with the superior edge SE of the template aligned with the superior edge SE of the dental dam. Then, when the patterns are of holes, the dentist places a pencil or pen through the holes of the patterns appropriate for his purpose and accordingly imprints markings on the dental dam through which the dentist pierces the dental dam to form holes through which teeth may protrude. When the patterns are of projections, ink may be applied to the projections, such as in using a rubber stamp or any printing device, to produce imprint markings on the dental dam.

Illustrated in FIG. 4 is a 5-inch × 5-inch dental dam 30 incorporating therein the present invention. The dental dam 30 comprises a thin sheet 31 of suitable plastic, flexible material, which may be rubber. The dental dam 30 is used in connection with a primary, mixed and permanent dentition.

At the upper portion of the sheet 31 is a pattern 32 of markings which follow the alignment of teeth as they appear in the average upper dental arch for the primary and mixed dentition. At the lower portion of the sheet 31 are three spaced patterns 33-35, which follow the alignment of the teeth as they appear in the average lower dental arch for the primary, mixed and permanent dentition, respectively.

If one were to place the device 15 (FIG. 2) above the dental dam 30 with the superior edge SE of the device 15 coincident with the superior edge SE of the dental dam 30 and then place a suitable writing implement in all of the holes of the patterns 16-19 of holes in the device 15, he would imprint on the dental dam 30 all the markings shown for the patterns 32-35 of markings on the dental dam 30.

It is within the contemplation of the present invention to premark the dental dam 30 by a suitable printing apparatus, rubber stamp or the like with all the markings of the patterns 32-35 of markings shown in FIG. 4 for the rubber dam 30. This will, of course, obviate the need of the device 15. Further it is within the contemplation of the present invention to have a dental dam in which openings are preformed in the dental dam in lieu of premarking the dental dam in the manner aforesaid. In this regard one or more groups of patterns can be formed by openings in lieu of marks at the locations previously described for marks.

It is apparent, of course, that the selection of the patterns 33-34 of markings of the lower arch of the dental dam 30 is made in accordance with the teeth of the lower dental arch to be clamped. The disclosure previously made in connection with the selection of patterns 17-19 for the device 15 is equally applicable to the selection of patterns 33-35 of markings for the dental dam 30.

In FIG. 5 is a 6-inch × 6-inch dental dam 40 incorporating therein the present invention. The dental dam 40 comprises a thin sheet 41 of suitable plastic flexible material, which may be rubber. The dental dam 40 is used in connection with the primary, mixed and permanent dentition.

At the upper portion of the sheet 41 is a pattern 42 of markings which follow the alignment of teeth as they appear in the average upper dental arch for the primary and mixed dentition. At the lower portion of the sheet 41 are four spaced patterns 43-46. The patterns 43-45 follow the alignment of the teeth as they appear in the average lower primary, mixed and permanent dental arch, respectively. Pattern 46 represents the average dental arch of the upper permanent dentition. The dam must be rotated 180° to utilize this pattern properly.

If one were to place the device 20 (FIG. 3) above the dental dam 40 with the superior edge SE of the device 20 aligned with the superior edge SE of the dental dam 40 and then place a suitable writing implement in all of the holes of the device 20, he would imprint on the dental dam 40 all the markings shown for the patterns 42-46 of markings on the dental dam 40.

It is within the contemplation of the present invention to premark the dental dam 40 by a suitable printing apparatus, rubber stamp or the like, all the markings of the patterns 42-46 of markings shown in FIG. 5 for the rubber dam 40. This will, of course, obviate the need of the device 20. Further, it is within the contemplation of the present invention to have a dental dam in which openings are preformed in the dental dam in lieu of premarking the dental dam in the manner aforesaid. In this regard one or more groups of patterns can be formed by openings in lieu of marks at the locations previously described for marks. It is apparent, of course, that the selection of the patterns 43-45 of markings or openings of the lower arch of the dental dam 40 is made in accordance with the teeth of the lower arch to be clamped. The disclosure previously made in connection with the selection of patterns 24-27 of markings is equally applicable to the selection of patterns 43-46 of markings for the rubber dam 40 or that matter preformed holes for the rubber dam 40.

The holes to be pierced in the dental dam for receiving the upper central incisors should be approximately 1 inch from the superior edge SE of the dental dam. Thus, the forwardmost hole or projection of the patterns 16 and 22 should be approximately 1 inch from the superior edge SE of the devices 15 and 20. Similarly, the forwardmost marking of the patterns 32 and 42 of markings of the dental dams 30 and 40 should be approximately one inch from the superior edge SE of the dental dams 30 and 40.

The holes to be punched in the dental dam for the permanent dental arch should be approximately 6 millimeters apart and the holes to be punched in the dental dam for the primary and mixed arch should be approximately 5 millimeters apart. The patterns 16-19, 22, 24-27, 32-35 and 42-46 follow average arch curvature and distances between teeth.

It has been found that when the upper second molar is to be clamped, the hole formed in the dental dam to receive the upper first permanent molar should be about 1 inch superior to the hole to be pierced in the rubber dam to receive the lower first permanent molar (See FIGS. 2 and 4). Thus, the holes in the device 15 and the markings in the rubber dam 30 are found to achieve this end.

From the foregoing, it is to be observed that there is a direct relationship between the superior edge SE of a dental dam and the location of the hole to be pierced for receiving a tooth in the lower arch to be clamped. The superior edge SE of the dental dam, as previously disclosed, is the edge of the dental dam below the nose of the patient and above the upper lip of the patient. Thus, the more distal the tooth to be clamped in the lower arch, the lower the pattern of the lower arch must be on the dental dam. (See patterns 33-35 of the dental dam 30 and patterns 43-46 of the dental dam 40.) It is apparent that the further into the distal portion of the oral cavity the dental dam must be attached, the more material of the dental dam is required to cover the upper lip. Therefore, if a pattern for locating holes to be pierced by a dentist or the holes preformed by the producer of the rubber dam for receiving teeth is to be located with reasonable accuracy, the pattern of a given lower arch must be designated the proper distance from the superior edge SE of the dental dam. However, the relationship of the tooth clamped in the upper arch and the superior edge SE of the dental dam is relatively constant and has only slight variations.

I claim:

1. A device for locating a marking on a dental dam which marking is pierced to form a hole through which hole a tooth protrudes comprising:
  a rigid body with a superior edge;
  means on said body defining a first pattern for a lower dental arch, pattern is spaced a predetermined distance from the superior edge of said body and follows the alignment of teeth as they appear in the lower dental arch; and
  means on said body defining at least one second pattern for a lower dental arch, said second patterns being spaced apart from said first pattern in a direction perpendicular to said superior edge, each of said second patterns being spaced a predetermined distance from the superior edge of said body and follows the alignment of teeth as they appear in the lower dental arch.

2. A device as claimed in claim 1 and comprising means on said body defining a second pattern for an upper dental arch, which second pattern is spaced a predetermined distance from the superior edge of said body and follows the alignment of teeth as they appear in the upper dental arch.

3. A device as claimed in claim 2 and comprising means on said body defining a third pattern of holes for an upper dental arch, which third pattern of holes is spaced a predetermined distance from the superior edge of said body and follows the alignment of teeth as they appear in the upper dental arch.

4. A device as claimed in claim 1 wherein one of said second patterns of said lower dental arch follows the alignment of teeth as they appear in the upper dental arch in response to said rigid body being rotated 180°.

5. A device as claimed in claim 1 wherein said first pattern is formed by openings.

6. A device as claimed in claim 1 wherein said first pattern is formed by projections.

7. A device as claimed in claim 3 wherein said first, second and third patterns are formed by openings.

8. A device as claimed in claim 3 wherein said first, second and third patterns are formed by projections.

9. A dental dam in which a hole is pierced and through which hole a tooth protrudes comprising:
  a flexible sheet with a superior edge;
  markings on said sheet defining a first pattern of markings for a lower arch which pattern of markings is spaced a predetermined distance from the superior edge of said sheet and follows the alignment of teeth as they appear in the lower dental arch; and
  markings on said sheet defining at least one second pattern of markings for a lower dental arch, said second patterns of markings being spaced apart from said first pattern of markings in a direction perpendicular to said superior edge, each of said second patterns of markings being spaced a predetermined distance from the superior edge of said sheet and follows the alignment of teeth as they appear in the lower dental arch.

10. A dental dam as claimed in claim 9 and comprising markings on said sheet defining a second pattern of markings for an upper dental arch, which second pattern of markings is spaced a predetermined distance from the superior edge of said sheet and follows the alignment of teeth as they appear in the upper arch.

11. A dental dam as claimed in claim 10 and comprising markings on said sheet defining a third pattern of markings for an upper dental arch, which third pattern of markings is spaced a predetermined distance from the superior edge of said sheet and follows the alignment of teeth as they appear in the upper dental arch.

12. A dental dam as claimed in claim 9 wherein said markings are formed simultaneously on said sheet.

13. A dental dam as claimed in claim 11 wherein said markings are formed simultaneously on said sheet.

14. A dental dam as claimed in claim 9 wherein one of said second patterns of said lower dental arch follows the alignment of teeth as they appear in the upper dental arch in response to said flexible sheet being rotated 180°.

15. A dental dam comprising:
  a flexible sheet with a superior edge;
  holes on said sheet forming a first pattern for a lower arch which pattern is spaced a predetermined distance from the superior edge of said sheet and follows the alignment of teeth as they appear in the lower dental arch; and
  holes on said sheet forming at least one second pattern for a lower dental arch, said second patterns being spaced from said first pattern in a direction perpendicular to said superior edge, each of said second patterns being spaced a predetermined distance from the superior edge of said sheet and follows the alignment of teeth as they appear in the lower dental arch.

16. A dental dam as claimed in claim 15 and comprising holes on said sheet forming a second pattern for an upper dental arch, which second pattern is spaced a predetermined distance from the superior edge of said sheet and follows the alignment of teeth as they appear in the upper arch.

17. A dental dam as claimed in claim 16 and comprising holes on said sheet forming a third pattern for an upper dental arch, which third pattern is spaced a predetermined distance from the superior edge of said sheet and follows the alignment of teeth as they appear in the upper dental arch.

18. A dental dam as claimed in claim 15 wherein one of said second patterns of said lower dental arch follows the alignment of teeth as they appear in the upper dental arch in response to said flexible sheet being rotated 180°.

* * * * *